(12) United States Patent
Saito (10) Patent No.: US 8,426,080 B2
(45) Date of Patent: Apr. 23, 2013

(54) GAS REPLACEMENT METHOD OF FUEL CELL, FUEL CELL SYSTEM AND DEVICE FOR FUEL CELL SYSTEM

(75) Inventor: Shuichiro Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1564 days.

(21) Appl. No.: 10/579,571

(22) PCT Filed: Dec. 2, 2004

(86) PCT No.: PCT/JP2004/018337
§ 371 (c)(1),
(2), (4) Date: May 17, 2006

(87) PCT Pub. No.: WO2005/055353
PCT Pub. Date: Jun. 16, 2005

(65) Prior Publication Data
US 2007/0099036 A1 May 3, 2007

(30) Foreign Application Priority Data
Dec. 2, 2003 (JP) .................. 2003-402841

(51) Int. Cl.
*H01M 8/04* (2006.01)
(52) U.S. Cl.
USPC ............ 429/512; 429/443; 429/515; 429/516
(58) Field of Classification Search .................. 429/512, 429/443, 515, 516
See application file for complete search history.

(56) References Cited

U.S. PATENT DOCUMENTS

| | | | |
|---|---|---|---|
| 6,242,120 | B1 | 6/2001 | Herron |
| 6,887,605 | B2 | 5/2005 | Herron |
| 7,655,332 | B2 | 2/2010 | Herron |
| 2003/0022038 | A1* | 1/2003 | Vaal et al. ............... 429/22 |
| 2004/0058204 | A1 | 3/2004 | Tamamura et al. |
| 2004/0214056 | A1 | 10/2004 | Gore |
| 2006/0263665 | A1* | 11/2006 | Schaevitz et al. ........... 429/34 |
| 2010/0136448 | A1 | 6/2010 | Herron |

FOREIGN PATENT DOCUMENTS

| | | |
|---|---|---|
| EP | 1306918 A2 | 5/2003 |
| JP | 11-219715 | 8/1999 |
| JP | 2002-141090 | 5/2002 |
| JP | 2002-158022 | 5/2002 |

(Continued)

OTHER PUBLICATIONS

Communication pursuant to Article 94(3) EPC in European Application No. 04 801 634.9 (Feb. 23, 2012).

(Continued)

*Primary Examiner* — Jane Rhee
(74) *Attorney, Agent, or Firm* — Fitzpatrick, Cella, Harper & Scinto (57) ABSTRACT

A method of replacing a gas in a fuel cell system is provided, which comprises the steps of detecting that a fuel cartridge is connected to the fuel cell system having a fuel cell and supplying a fuel from the fuel cartridge on the basis of the detection to start replacement of gas in the fuel cell system. Thereby, a simple gas replacement method is provided for replacing the gas other than the fuel, which has entered the fuel cell system that is supplied with the fuel from the fuel cartridge, with the fuel. Especially, a user does not have to perform the gas replacement operation manually. The gas replacement can be automatically performed.

15 Claims, 10 Drawing Sheets

FOREIGN PATENT DOCUMENTS

| | | |
|---|---|---|
| JP | 2002-313390 | 10/2002 |
| JP | 2003-123817 A | 4/2003 |
| JP | 2003-142131 | 5/2003 |
| JP | 2003-168456 | 6/2003 |
| JP | 2003-223908 | 8/2003 |
| WO | 01/26173 A1 | 4/2001 |

OTHER PUBLICATIONS

Communication pursuant to Article 94(3) EPC in European Application No. 04 801 634.9 (Apr. 6, 2011).

* cited by examiner

GAS REPLACEMENT METHOD OF FUEL CELL, FUEL CELL SYSTEM AND DEVICE FOR FUEL CELL SYSTEM

TECHNICAL FIELD

The present invention relates to a gas replacement method in a fuel cell system that uses a gas such as hydrogen as fuel, and particularly relates to a gas replacement method, a fuel cell system and a device for the fuel cell system, which replace a gas other than the fuel in the fuel cell system with the fuel to fill the inside of the fuel cell system with the fuel, which is supplied from a fuel cartridge.

BACKGROUND ART

In recent years, damage to the environmental has become a problem, and clean energy that does not result in the production of harmful waste is required. Exhaustion of fossil fuels has also become a problem, and a new energy source is in demand. Meanwhile, in the electronics field, the amount of information that needs to be processed continues to dramatically increase, leading to the increase in electric power consumption of the electronic equipment.

Thus, hydrogen, which is contained in water that is inexhaustible on Earth, has a large chemical energy, and does not discharge harmful substances, has attracted attention as an energy source. A fuel cell, which directly produces electric energy, can extract a large amount of electric power with the highly efficient use of hydrogen, and therefore, can be used in automobiles and portable electronic devices, such as notebook computers, mobile phones and digital camcorders, is being advanced.

A so-called fuel cell, which extracts electrical energy from hydrogen, has a hydrogen electrode to which hydrogen is supplied and an oxidation electrode to which oxygen is supplied, separates hydrogen atoms into electrons and protons by a catalytic reaction in the hydrogen electrode. The protons pass through an electrolyte membrane and then reach the oxidation electrode and react with oxygen by a catalytic reaction, whereby water is generated. Along with the water, a flow of electrons, namely electric power, is also generated.

Unlike the conventional batteries, fuel cells do no need an electric charge, and it is possible to generate electric power immediately by only replenishing it with fuel after the fuel is used up, which is convenient for a long-term use of a device.

A fuel cell system that supplies fuel into the fuel cell system from a fuel cartridge is described, for example, in Japanese Patent Application Laid-open No. 2002-158022.

DISCLOSURE OF THE INVENTION

As described above, the fuel cell can produce electrical energy by being replenished with fuel at any time and place, but has to use a gas, such as hydrogen, unlike a conventional secondary battery.

When a fuel cartridge is replaced, it is necessary to temporarily remove it from a fuel cell system. As a result, atmospheric air will enter the fuel cell system, leading to a significantly reduction in the output of the fuel cell. In many cases, the reaction in the fuel cell stops. Accordingly, it is essential to replace the gas inside the fuel cell system with the fuel gas at the time of fuel replacement.

Gas replacement is also necessary when any gas other than the fuel gas enters a fuel cell system.

When a fuel cell system is not of a cartridge type, but is provided integrally with a fuel tank, there is a possibility that any gas other than the fuel may enter the fuel cell system.

The present invention has been accomplished in view of such background art, and it is, therefore, an object of the present invention to provide a simpler gas replacement method, fuel cell system and device for the fuel cell system to replace the gas other than fuel, which enters the fuel cell system that is supplied with the fuel from a fuel cartridge or a fuel tank provided in the fuel cell system, with the fuel gas. In particular, the present invention provides an automatic gas replacement method, fuel cell system and a device for the fuel cell system, which makes it unnecessary for the user to manually perform the gas replacement operation.

Namely, according to a first aspect of the present invention, there is provided a method of replacing gas in a fuel cell system, comprising the steps of:

detecting that a fuel cartridge is connected to a fuel cell system comprising a fuel cell; and supplying a fuel from the fuel cartridge on the basis of the detection to start replacement of the gas in the fuel cell system.

In the present invention, it is preferred that the gas replacement is performed for a predetermined period of time.

Further, it is preferred that the gas in the fuel cell system is discharged from a purge valve provided in the fuel cell system based on the detection.

Moreover, it is preferred that the replacement of the gas in the fuel cell system is performed until an output voltage of the fuel cell reaches at least a predetermined value.

According to a second aspect of the present invention, there is provided a method of replacing a gas in a fuel cell system, comprising the steps of:

detecting an output voltage of a fuel cell provided in a fuel cell system; and when the output voltage becomes a predetermined value or less, supplying a fuel from a fuel cartridge to start replacement of the gas in the fuel cell system.

It is preferable to perform the replacement of the gas in the fuel cell system until the output voltage of the fuel cell reaches at least a predetermined value.

According to a third aspect of the present invention, there is provided a method of replacing a gas in a fuel cell system, comprising the steps of:

detecting an output voltage of a fuel cell provided in a fuel cell system; and when the output voltage becomes a predetermined value or less, supplying a fuel from a fuel tank provided in the fuel cell system to start replacement of the gas in the fuel cell system.

It is preferable to perform the replacement of the gas in the fuel cell system until the output voltage of the fuel cell reaches at least a predetermined value.

According to a fourth aspect of the present invention, there is provided a method of replacing a gas in a fuel cell system attached to a device, comprising the step of, when a switch of a device to which a fuel cell system is attached is turned on, supplying a fuel from a fuel cartridge to start replacement of the gas in the fuel cell system.

It is preferred that the switch is a power source switch of the device.

According to a fifth aspect of the present invention, there is provided a method of replacing a gas in a fuel cell system attached to a device, comprising the step of, when a switch of a device to which a fuel cell system is attached is turned on, supplying a fuel from a fuel tank provided in the fuel cell system to start replacement of the gas in the fuel cell system.

According to a sixth aspect of the present invention, there is provided a fuel cell system, comprising:
 a fuel cell;
 a connecting part for connecting a fuel cartridge; and
 a sensor for detecting that the fuel cartridge is connected to the connecting part,
 wherein a fuel is supplied from the fuel cartridge connected to the connecting part on the basis of the detection by the sensor to start replacement of a gas in the fuel cell system.

According to a seventh aspect of the present invention, there is provided a fuel cell system, comprising:
 a fuel cell;
 a connecting part for connecting a fuel cartridge; and
 a voltage detector for detecting an output voltage of the fuel cell,
 wherein when the output voltage detected by the voltage detector becomes a first predetermined value or less, a fuel is supplied from the fuel cartridge connected to the connecting part to start replacement of a gas in the fuel cell system.

According to an eighth aspect of the present invention, there is provided a fuel cell system, comprising:
 a fuel cell;
 a fuel tank; and
 a voltage detector for detecting an output voltage of the fuel cell,
 wherein when the output voltage detected by the voltage detector becomes a first predetermined value or less, a fuel is supplied from the fuel tank to start replacement of a gas in the fuel cell system.

According to a ninth aspect of the present invention, there is provided a device for a fuel cell system, comprising:
 an attaching part for attaching a fuel cell system; and
 a switch provided in the device,
 wherein a fuel is supplied from a fuel cartridge connected to the fuel cell system in response to turning on the switch to start replacement of a gas in the fuel cell system.

According to a tenth aspect of the present invention, there is provided a device for a fuel cell system, comprising:
 a fuel cell system comprising a fuel cell and a connecting part for connecting a fuel cartridge; and
 a switch provided in the device,
 wherein a fuel is supplied from the fuel cartridge connected to the fuel cell system in response to turning on the switch to start replacement of a gas in the fuel cell system.

According to an eleventh aspect of the present invention, there is provided a device for a fuel cell system, comprising:
 a fuel cell system comprising a fuel cell and a fuel tank; and
 a switch provided in the device,
 wherein a fuel is supplied from the fuel tank of the fuel cell system in response to turning on the switch to start replacement of a gas in the fuel cell system.

With the gas replacement method of a fuel cell system, the fuel cell system and the device for a fuel cell system in accordance with the present invention, it is possible to replace the gas other than the fuel, which has entered a fuel cell that is supplied with the fuel from a fuel cartridge or a fuel tank provided in the fuel cell system, with the fuel gas more easily. Especially, the user does not have to perform the gas replacement operation manually. The gas replacement can be automatically performed to actuate the fuel cell.

Other features and advantages of the present invention will be apparent from the following description taken in conjunction with the accompanying drawings.

BEST MODE FOR CARRYING OUT THE INVENTION

The gas replacement method of a fuel cell of the present invention is a method of replacing gas in a fuel cell system, which comprises detecting that a fuel cartridge is connected to a fuel cell system comprising a fuel cell and supplying a fuel from the fuel cartridge on the basis of the detection to start replacement of gas in the fuel cell system.

Further, the gas replacement method of a fuel cell of the present invention is a method of replacing a gas in a fuel cell system, which comprises detecting an output voltage of a fuel cell provided in a fuel cell system, and when the output voltage becomes a predetermined value or less, supplying a fuel from a fuel cartridge to start replacement of the gas in the fuel cell system.

Moreover, the gas replacement method of a fuel cell of the present invention is a method of replacing a gas in a fuel cell system, which comprises detecting an output voltage of a fuel cell provided in a fuel cell system, and when the output voltage becomes a predetermined value or less, supplying a fuel from a fuel tank provided in the fuel cell system to start replacement of the gas in the fuel cell system.

Further, the gas replacement method of a fuel cell of the present invention is a method of replacing gas in a fuel cell system attached to a device, which comprises, when a switch of a device to which a fuel cell system is attached is turned on, supplying a fuel from a fuel cartridge to start replacement of a gas in the fuel cell system.

Moreover, the gas replacement method of a fuel cell of the present invention is a method of replacing gas in a fuel cell system attached to a device, which comprises, when a switch of a device to which a fuel cell system is attached is turned on, supplying a fuel from a fuel tank provided in the fuel cell system to start replacement of a gas in the fuel cell system.

In the above-described gas replacement methods of the fuel cell in accordance with the present invention, it is preferable to perform the replacement of the gas in the fuel cell system until the output voltage of the fuel cell of the fuel cell system reaches at least a predetermined value.

In the present invention, as described above, that the connection of the fuel cartridge to the fuel cell system is detected, and the gas replacement operation can be performed automatically. Alternatively, the output of the fuel cell is detected, and the gas replacement can be performed when a predetermined voltage is not produced. Alternatively, the gas replacement can be performed in synchronization with the turning on of a switch of a portable electronic device, for example, a personal computer, a mobile phone, a digital camera, or a digital camcorder. It is especially preferable to synchronize the gas replacement with the turning on of a main switch of such a portable electronic device. For example, in most devices, a main switch will be a main power source switch.

Preferred embodiments of the present invention will be described with reference to the drawings.

Figure 1:
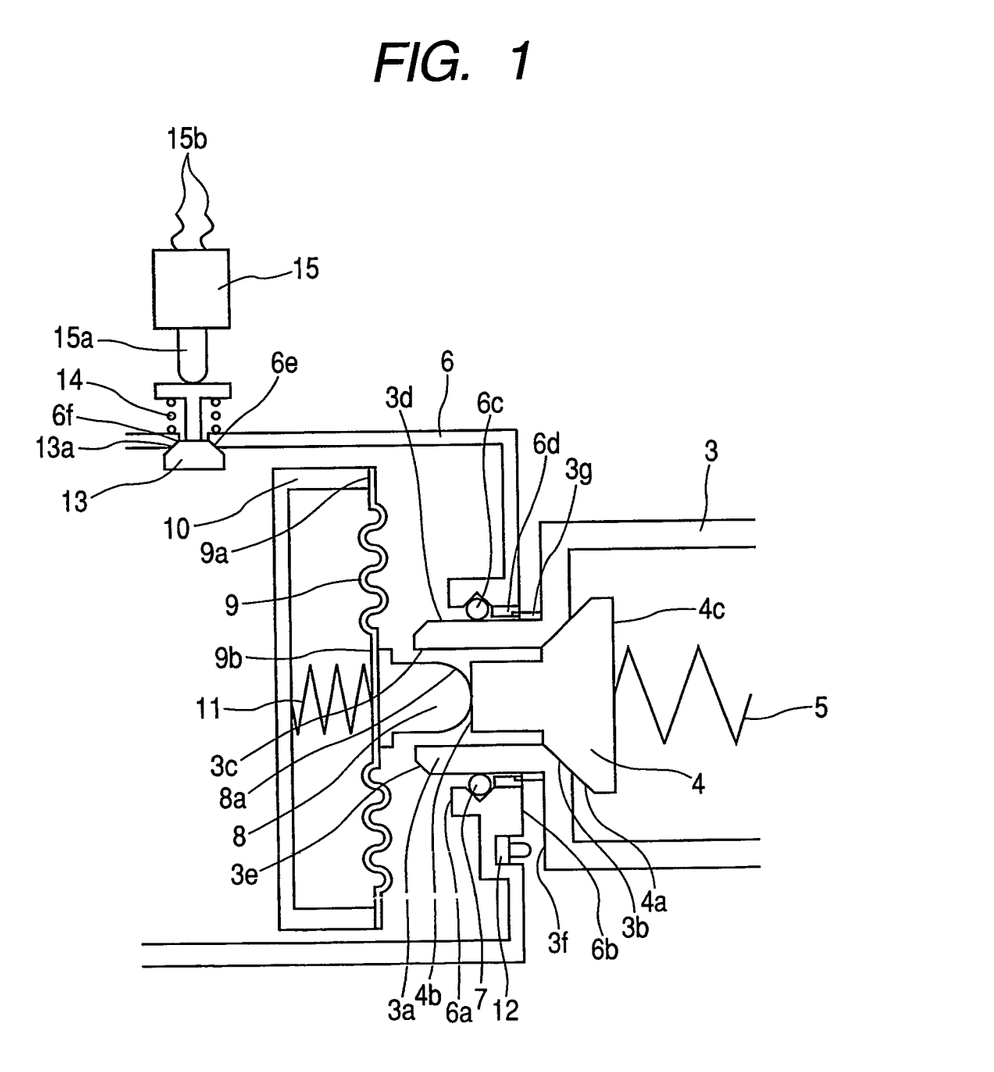
FIG. 1 is a central sectional view of a main part of a fuel cell system for explaining a preferred embodiment of the gas replacement method of the fuel cell system in accordance with the present invention.
Figure 2:
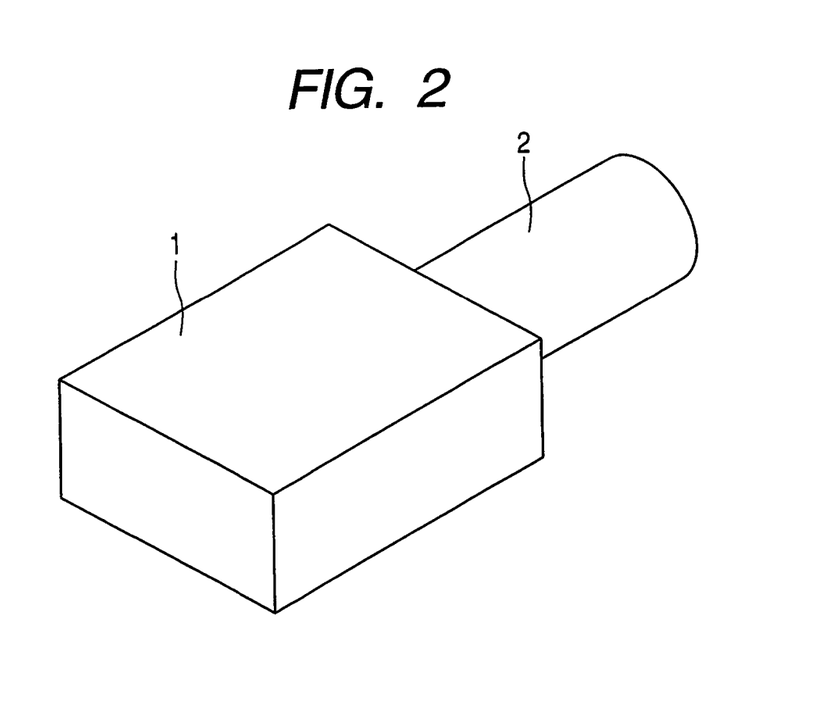
FIG. 2 is a perspective view showing the appearance of a fuel cell system and a fuel cartridge.
Figure 3:
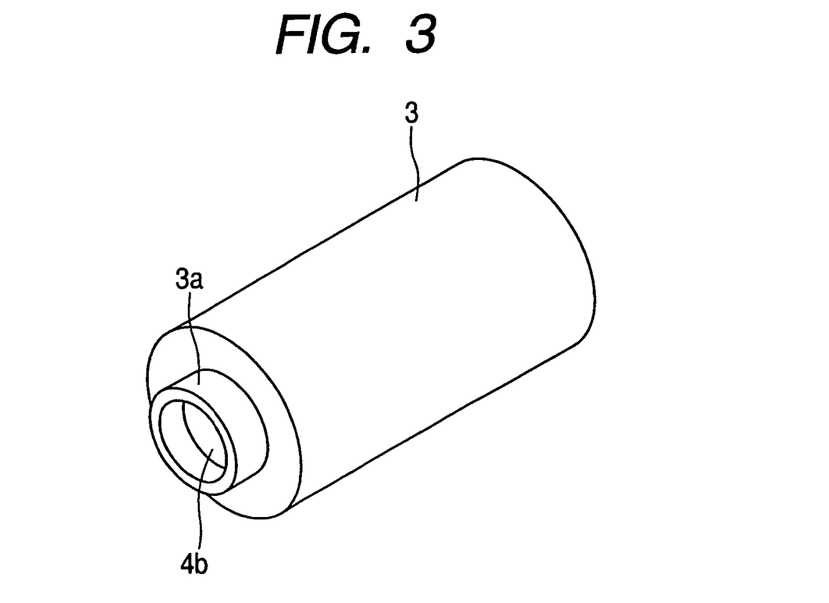
FIG. 3 is a perspective view showing the fuel cartridge of FIG. 2.

FIG. 1 is a central sectional view showing a main part of a fuel cell system and a fuel cartridge showing a preferred embodiment of the present invention. FIG. 2 is a perspective view showing a fuel cell system 1 connected to a fuel cartridge 2. In this embodiment, the fuel cell system 1 is contained in a portable electronic device, for example, a digital camera. The fuel cell system 1 may be constructed to be detachable from the portable device. The fuel cartridge 2 is capable of being inserted from outside of the digital camera. FIG. 3 is a perspective view showing the fuel cartridge. Reference numeral 3 denotes a cartridge casing, which may be filled with compressed hydrogen, or which may have a structure where a hydrogen storage alloy such as, for example, Fe—Ti alloy and Ti—Mn alloy, are made to occlude hydrogen. Reference numeral 3a denotes a cover member that will be described in detail below, and reference numeral 4b denotes a protruding part of a valve.

In FIG. 1, reference numeral 6 denotes a casing of the fuel cell system. Reference numeral and character 6a denotes a recessed part (namely, the recessed part 6a is a connecting part on the fuel cell system side to which the connecting part of the fuel cartridge is connected), into which the connecting part of the fuel cartridge is inserted. Reference numeral and character 3a denotes the cover member, which is disposed around the protruding part 4b of a valve 4, and a protruding part thereof is larger than the protruding part 4b. A circular conical surface 4a of the valve 4 is in contact with a circular conical surface 3b of the fuel cartridge so that the fuel gas does not leak to the outside. Reference numeral 5 denotes a compression spring the right end portion of which in the drawing is fixed to a member (not shown) inside the fuel cartridge, and the left end portion of which presses a bottom surface 4c of the valve 4. Namely, hydrogen gas pressure and a force of the compression spring 5 bring the circular conical surfaces 3b and 4a into contact with each other so that the hydrogen gas does not leak to the outside the fuel cartridge.

The valve 4 and the cover member 3a in the drawing are made smaller than a finger of a child to prevent the child from reaching the protruding part 4b of the valve 4 in a hole 3c of the cover member.

Reference numeral and character 6a denotes the recessed part, in which a V-shaped groove 6c is formed, and an O-ring 7 as a seal member is disposed therein. Reference numeral and character 3g denotes a screw part provided at the cover member 3a.

Next, an operation will be explained based on FIG. 1.

When the fuel cartridge 2 is inserted, a chamfered portion 3e formed at a tip end portion of the cover member 3a abuts the seal member 7, and the cover member 3a moves in the leftward direction in FIG. 1 while compressing the seal member 7. The seal member 7 is in close contact with an outer surface 3d of the cover member 3a to make a fuel flow path airtight.

Reference numeral and character 6d denotes a screw part provided at the recessed portion 6a. After the seal member 7 is compressed by the recessed part 6a and the cover member 3a and air-tightness of the fuel flow path is secured, the screws 3g and 6d are engaged with each other to screw the casing 3 of the fuel cartridge into the casing 6 of the fuel cell system, whereby the valve 4 and a pin 8 abut each other, and the fuel cartridge 2 is further inserted into the recessed part 6a against the fuel gas pressure and the force of the compression spring 5, thus releasing the contact between the circular conical surfaces 3b and 4a and supplying hydrogen gas to the fuel cell system 1 from the inside of the casing 3 of the fuel cartridge.

A surface 3f of the casing 3 of the fuel cartridge and a surface 6b of the casing 6 of the fuel cell system abut each other to complete the insertion, and the fuel cell system 1. The fuel cartridge 2 are fixed to each other.

Reference numeral 9 denotes a diaphragm, which has a disc shape, and an outer peripheral part 9a is fixed to a casing 10 of a regulator body. The casing 10 is fixed to a fixed member (not shown) inside the casing 6. The diaphragm 9 has a pin 8 fixed to a plane part 9b in the center, has a corrugated recesses and protrusions formed concentrically, has a spring characteristic, and receives hydrogen pressure at the right side in the drawing and gas pressure of the inside of the casing 10. The diaphragm 9 is freely displaceable in the left and right hand direction in the drawing in accordance with the change in the hydrogen gas pressure.

The right end portion in the drawing of the pin 8 is a spherical surface 8a, which is made to abut the protruding part 4b of the valve 4. Reference numeral 11 denotes a compression spring, one end of which is fixed to the inside of the casing 10 and the other end of which is fixed to a surface opposite to the pin, of the plane part 9b of the diaphragm 9 having the pin fixed thereto.

Next, an operation will be explained. When the casing 3 of the fuel cartridge is inserted and is screwed in with the screw, parts 3g and 6d are engaged with each other, surfaces 3f and 6b abut each other, and the hydrogen gas pressure inside the fuel cartridge and the compression spring 5 exert a force in the leftward direction in the drawing. The gas pressure inside the casing 10 of the diaphragm and the compression spring 11 exert a force in the rightward direction in the drawing. The gas pressure inside the casing 6 of the fuel cell system exerts a force in the leftward direction in the drawing to the diaphragm 9. The resultant force of these forces determines the positions of the pin 8 and the valve 4. Namely, when the hydrogen gas pressure inside the casing 6 of the fuel cell system is at a predetermined value, the circular conical surface 4a of the valve 4 and the circular conical surface 3b of the fuel cartridge abut each other and a flow of the hydrogen gas into the fuel cell system side from the fuel cartridge side is stopped.

When the hydrogen gas is consumed during the power generation of the fuel cell reaction, the hydrogen gas pressure inside the casing 6 of the fuel cell system decreases, so that the diaphragm 9 is displaced in the rightward direction in the drawing. As a result, the pin 8 presses the valve 4 in the rightward direction in the drawing to displace it, whereby the contact of the circular conical surfaces 4a and 3b is released, and the hydrogen gas inside the casing 3 of the fuel cartridge flows into the fuel cell system side.

As explained above, the outer peripheral part of the diaphragm is fixed to the casing 10 of the regulator and is therefore not influenced by the ambient air pressure. Accordingly, by properly setting the gas pressure inside the casing 10 of the regulator and the force of the compression spring 11, a desired hydrogen gas pressure can be maintained. Alternatively, without using the compression spring shown in this embodiment, by only setting the gas pressure inside the casing 10 of the regulator suitably, it is possible to obtain the desired hydrogen gas pressure.

Reference numeral 12 denotes a sensor for detecting if the fuel cartridge is connected to the connecting part of the fuel cell system. In this example, reference numeral 12 denotes a micro switch, which is disposed so as to be turned on just before the fuel cartridge is fixed to the fuel cell system. Reference numeral 13 denotes a purge valve that performs the gas replacement, and a circular conical surface 13a thereof abuts a circular conical surface 6e formed at the casing 6 of the fuel cell system. Reference numeral 14 denotes a compression spring, which biases the purge valve 13 in the upward direction in the drawing. The compression spring 14 always keeps the circular conical surfaces 13a and 6e in contact with each other, so that the gas inside the fuel cell system does not leak to the outside. Reference numeral 15 is an electromagnet. By energizing two lead wires 15b, a plunger 15a displaces in the downward direction in the drawing against the force of the compression spring 14 to release the contact between the circular conical surfaces 13a and 6e so that the gas inside the fuel cell system flows to the outside.

Figure 4:
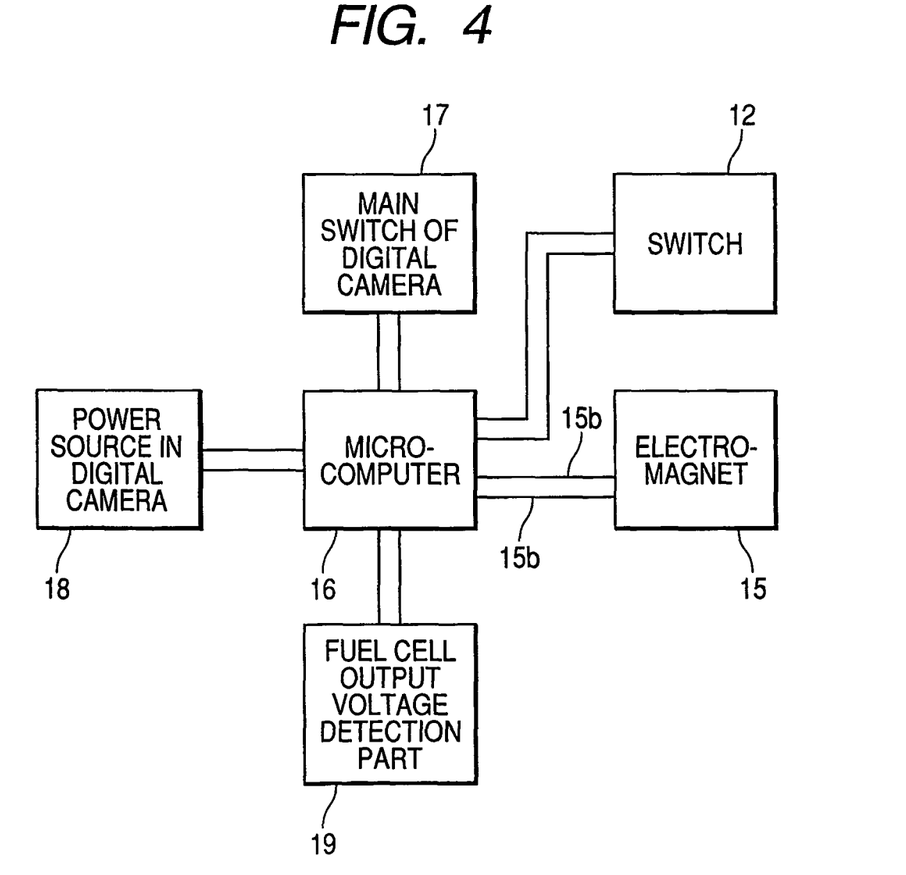
FIG. 4 is a block diagram for explaining the present invention.

FIG. 4 is a block diagram according to the present invention.

In the figure, reference numeral 12 denotes the switch shown in FIG. 1, and reference numeral 15 denotes the electromagnet shown in FIG. 1. Reference numeral 16 is a microcomputer as a control means inside a device where the fuel cell system body is disposed. In this embodiment, the device is a digital camera, and reference numeral 17 denotes the main switch of the digital camera. Reference numeral 18 denotes the power source in the digital camera, which is used for actuation or the like of the fuel cell. Reference numeral 19 denotes a fuel cell output voltage detecting part.

Next, the operation will be explained. As is seen from FIG. 1, when the fuel cartridge is attached, the ambient air enters from the hole 6a of the casing 6 of the fuel cell system. In this state, the reaction of the fuel cell does not advance. Just before completing the attaching the fuel cartridge, the switch 12 is turned on, and the signal is inputted into the microcomputer 16. The microcomputer 16 energizes the electromagnet 15 for a predetermined period of time to open the purge valve 13, whereby the gas inside the fuel cell system is discharged to the outside and the pressure inside the fuel cell system decreases. Thus, the fuel gas is supplied from the fuel cartridge, as a result of which the gas inside the fuel cell system is replaced with the fuel gas. In this case, the point to be noted is that unless the gas pressure inside the fuel cell system is higher than the atmospheric pressure, the replacement of the gas will not occur, and the ambient air will enter the system instead. Accordingly, in this embodiment, the gas pressure inside the fuel cell system must be set higher than the atmospheric pressure.

Instead of purging the gas inside the fuel cell system to the atmosphere by the purge valve, the gas may be recovered by a recovering tank, for example.

Figure 5:
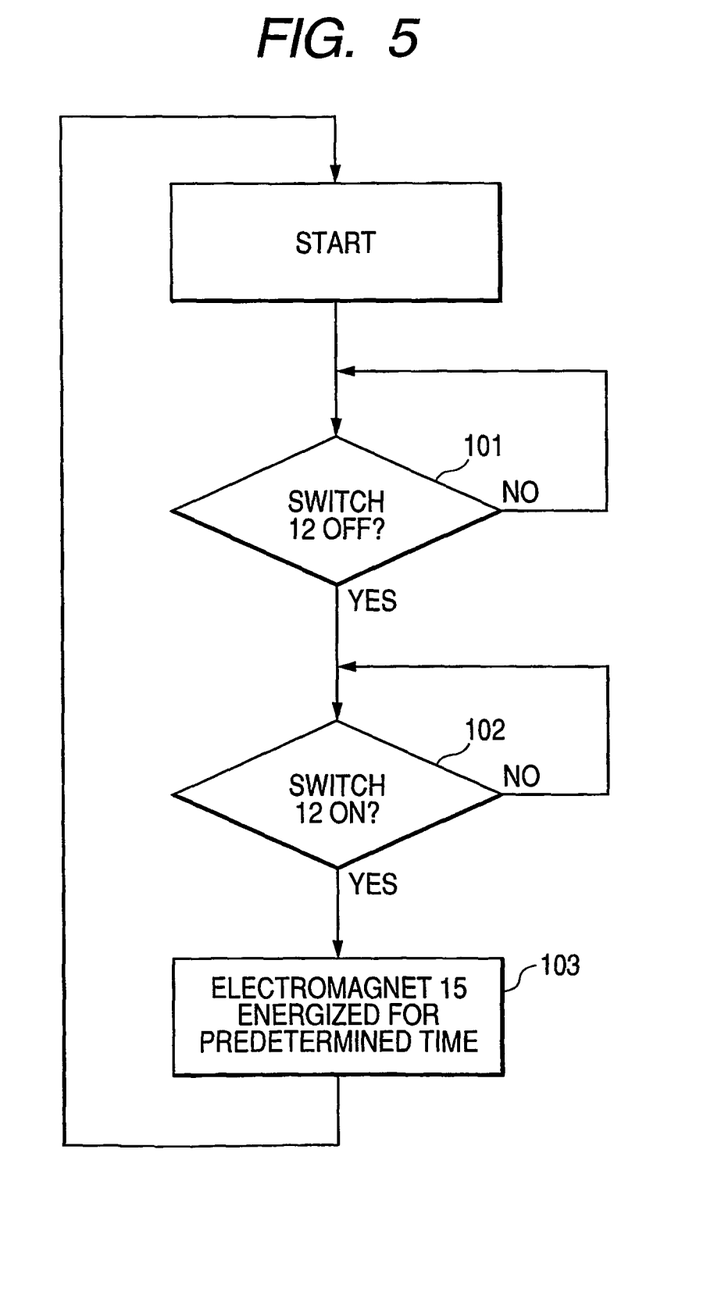
FIG. 5 is a flow chart explaining an operation according to a preferred embodiment of the present invention.

FIG. 5 is a flow chart for explaining the operation, which is discussed below.

Even when the main switch 17 of the digital camera of FIG. 4 is in the OFF state, the microcomputer 16 operates and performs the detection of attachment/detachment of the fuel cartridge.

The microcomputer 16 detects the state of the switch 12 (101). If the switch is in the ON state, the microcomputer 16 performs the loop and continues the detection of the switch 12.

When the microcomputer 16 detects that the switch 12 (101) is in the OFF state, it performs the loop and continues the detection until the switch 12 is turned ON (102). Because turning on the switch 12 means that the fuel cartridge is attached, the program jumps to the next step, where the electromagnet is energized for a predetermined period of time (103) to replace the gas.

Accordingly, without a special operation of the user, the gas replacement is automatically performed. Next, the program returns to the start, and the above operation is repeated.

Figure 6:
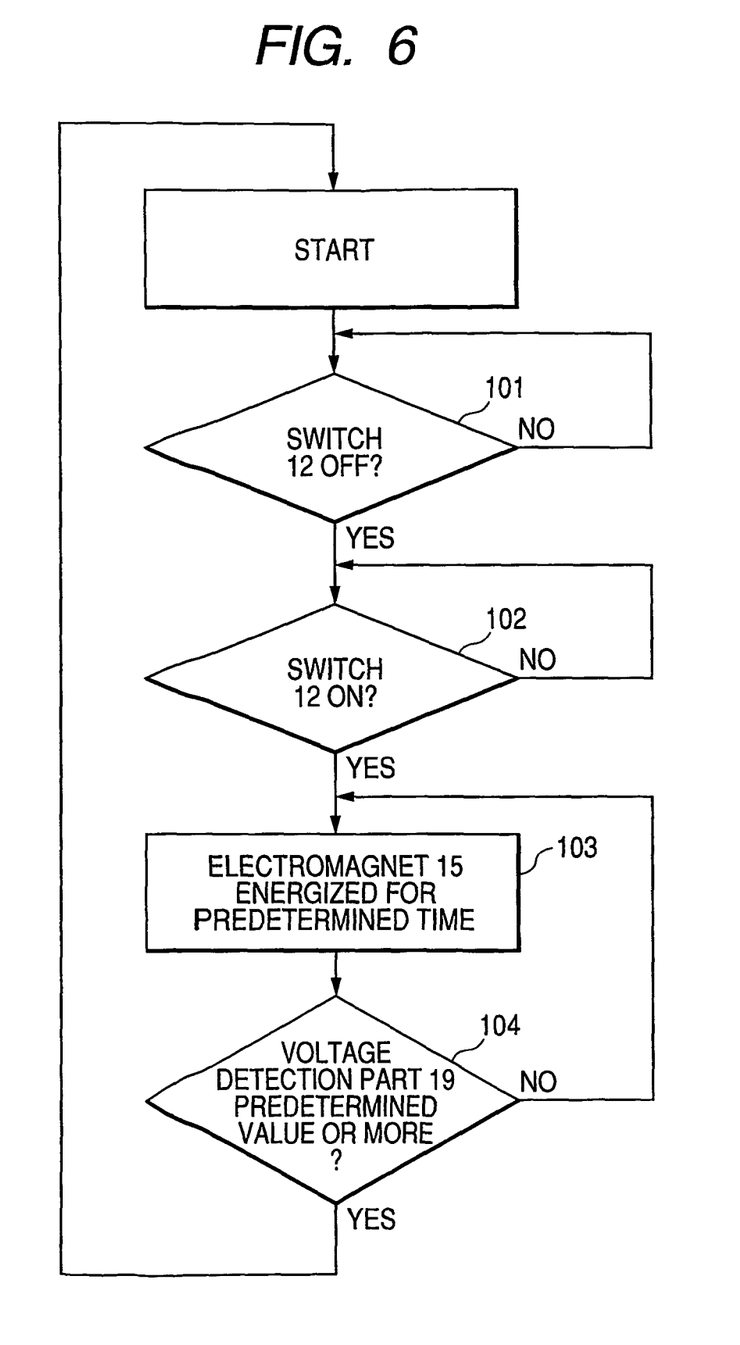
FIG. 6 is a flow chart explaining an operation according to a preferred embodiment of the present invention.

FIG. 6 is a flow chart for explaining another embodiment.

In this embodiment, the operation of the fuel cell output detection part 19 shown in FIG. 4 is added to the flow chart shown in FIG. 5. After the program proceeds to the step 103 in the flow chart in FIG. 5, the fuel cell output voltage detection part 19 detects the voltage (104). When the voltage is less than a predetermined value, it is determined that the gas replacement is insufficient and the program returns to the step 103, where the electromagnet 15 is energized for the predetermined period of time, the purge valve opens, and the gas replacement is performed. When it is determined that the voltage is the predetermined value or more (104), the series of operation is finished and the program returns to the start, and the operation of the flow chart is continued.

The operation of the above flow charts in FIGS. 5 and 6 can be performed only when the digital camera main switch 17 is in the ON sate. In this case, consumption of the power source 18 in the digital camera can be reduced.

Next, still another embodiment will be explained. A digital camera involved in this embodiment detects the voltage in the fuel cell output voltage detection part 19 when the main switch 17 is in the ON state. When the voltage becomes a first value or less, the purge valve 13 is opened for a predetermined period of time to perform the gas replacement.

Alternatively, until the voltage detected in the fuel cell output voltage detection part 19 becomes a second predetermined value or more, the purge valve 13 is opened.

The first predetermined value and the second predetermined value may be properly determined depending on the characteristics of the fuel cell, and may be set at different values or the same value depending on the characteristics.

Figure 7:
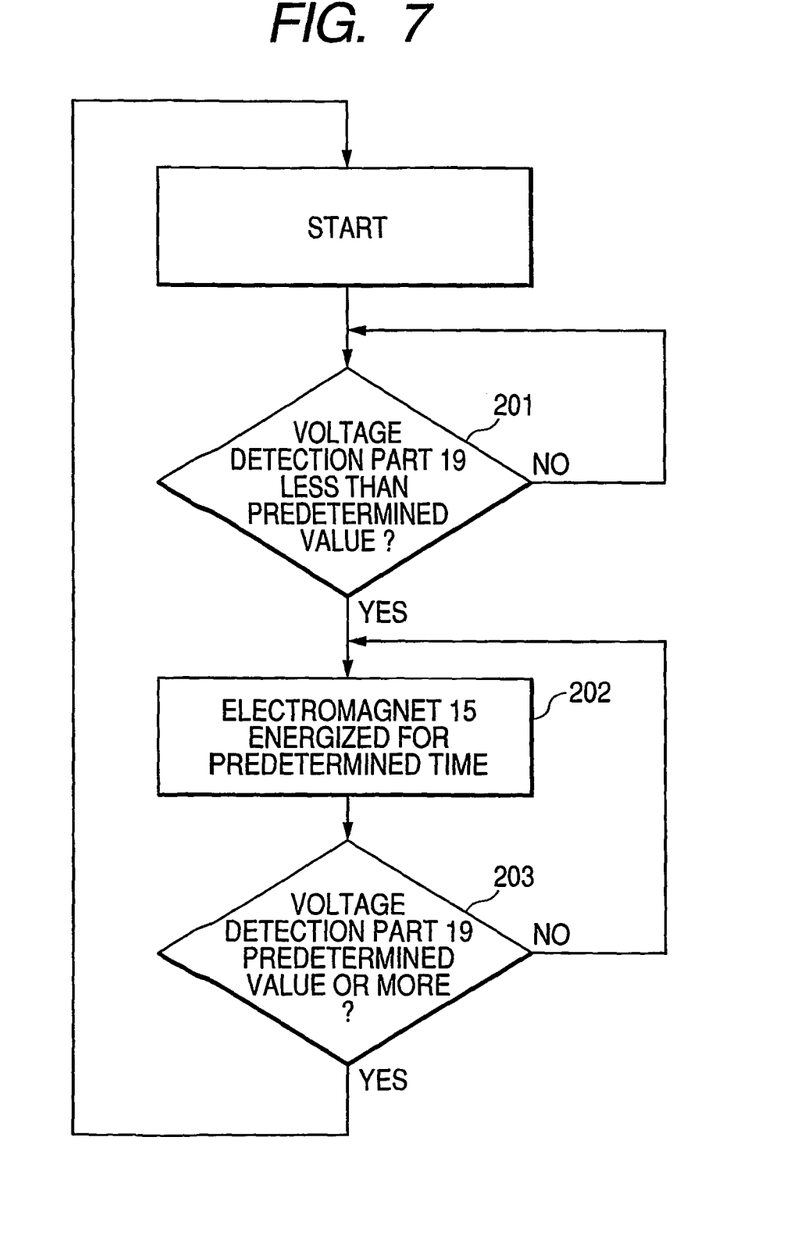
FIG. 7 is a flow chart explaining an operation according to a preferred embodiment of the present invention.

The explanation may be found in the flow chart in FIG. 7. At the time of operation of a digital camera, the fuel cell output voltage detection part 19 detects the voltage at all times or at predetermined time intervals and determines whether the voltage is less than the predetermined value (201). When the voltage is the predetermined value or more, the voltage detection is continued. When the voltage is less than the predetermined value, the program jumps to the next step, and the electromagnet 15 is energized for a predetermined period of time (202), whereby the purge valve 13 is opened and gas replacement is performed. Thereafter, the fuel cell output voltage detection part 19 detects the voltage and determines whether the voltage is at least the predetermined value (203). When the voltage does not reach the predetermined value, the gas replacement is insufficient, and the program returns to step (202), where the electromagnet 15 is energized for the predetermined period of time and the gas replacement is performed. Thereafter, it is determined whether the voltage is at least the predetermined value (203), and when the voltage is the predetermined value or more, the program returns to the start, and the same procedure is repeated.

Accordingly, a stable operation of the fuel cell is possible without any special attention from the user.

Next, still another embodiment will be explained. In this embodiment, whenever the main switch 17 of the digital camera is turned ON, the electromagnet 15 is energized for a predetermined period of time, whereby the purge valve 13 is opened and the gas replacement is performed.

Figure 8:
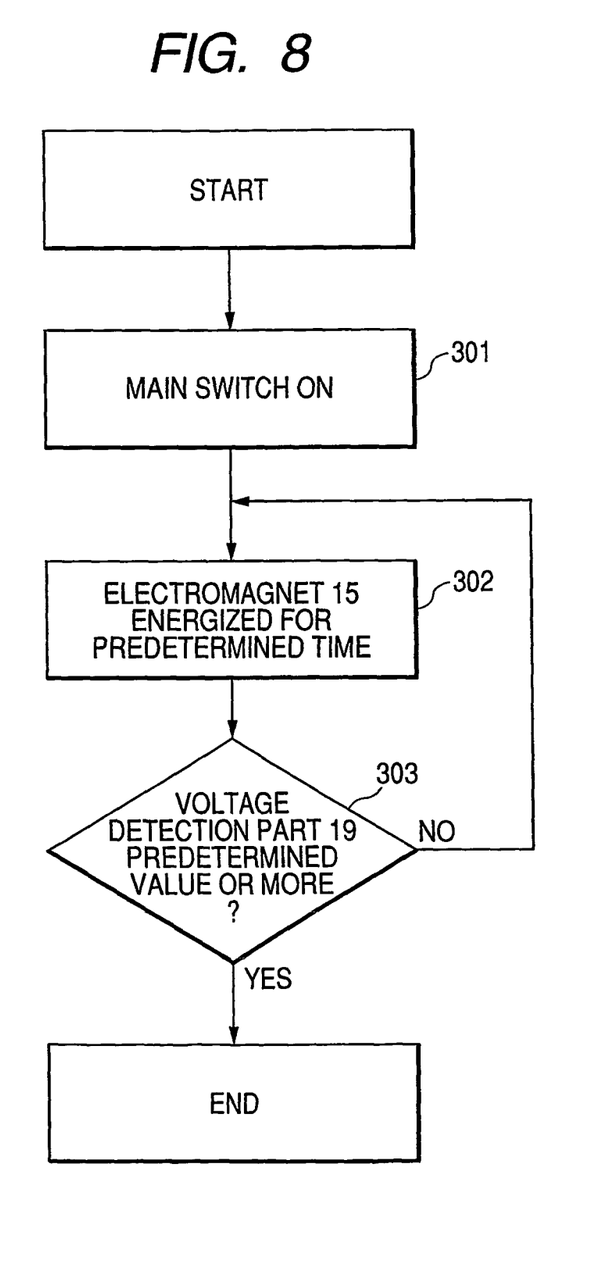
FIG. 8 is a flow chart explaining an operation according to a preferred embodiment of the present invention.

FIG. 8 is a flow chart for explaining this process. When the digital camera main switch 17 is turned ON (301), the electromagnet 15 is energized for a predetermined period of time (302) and the purge valve 13 is opened, whereby the gas replacement is performed. Thereafter, the fuel cell output voltage detection part 19 detects the voltage and determines whether the voltage is at least the predetermined value (303). When the voltage is less than the predetermined value, the gas replacement is insufficient, and therefore, the program returns to step (302), where the electromagnet 15 is energized for the predetermined period of time, and gas replacement is performed. Thereafter, it is determined whether the voltage is at least the predetermined value (303), and when the voltage is the predetermined value or more, the procedure is finished.

According to this embodiment, without the awareness of the user, the fuel cell operates in a normal manner. In this embodiment, detection of the fuel cell output voltage may not be necessarily performed, and the electromagnet 15 may be only energized for the predetermined time.

Figure 9:
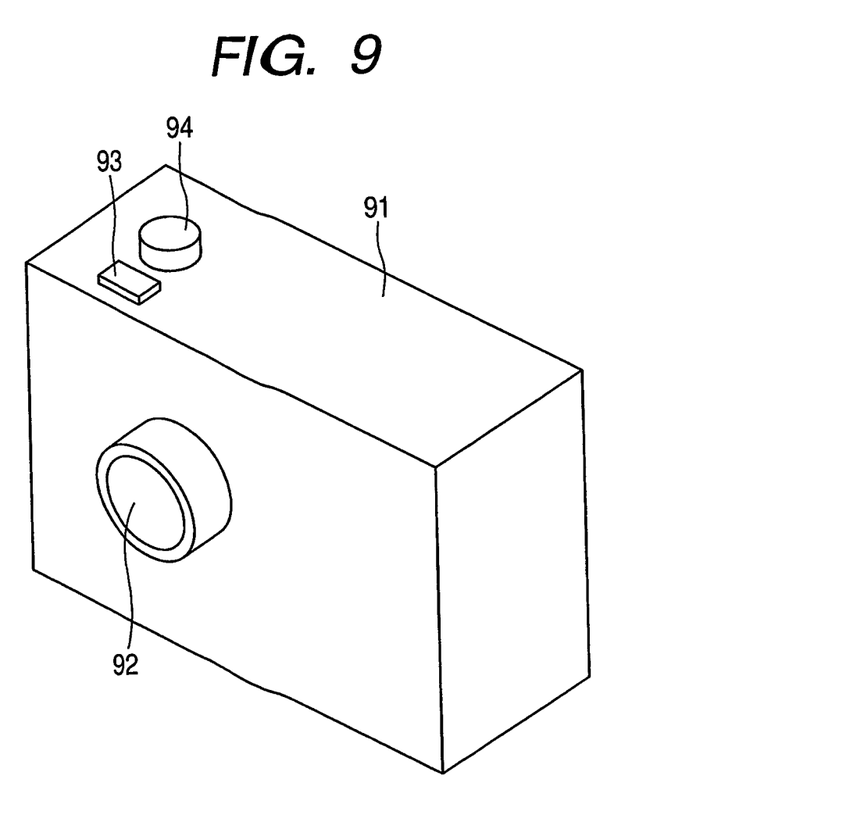
FIG. 9 is a schematic perspective view showing a digital camera using the fuel cell system according to the present invention.

FIG. 9 is a perspective view showing a digital camera as one example of a device using the fuel cell system according to the present invention. In the figure, reference numeral 91 denotes a camera body, reference numeral 92 denotes a lens, and reference numeral 93 denotes a main switch, which is linked to the digital camera switch 17 shown FIG. 4.

Figure 10:
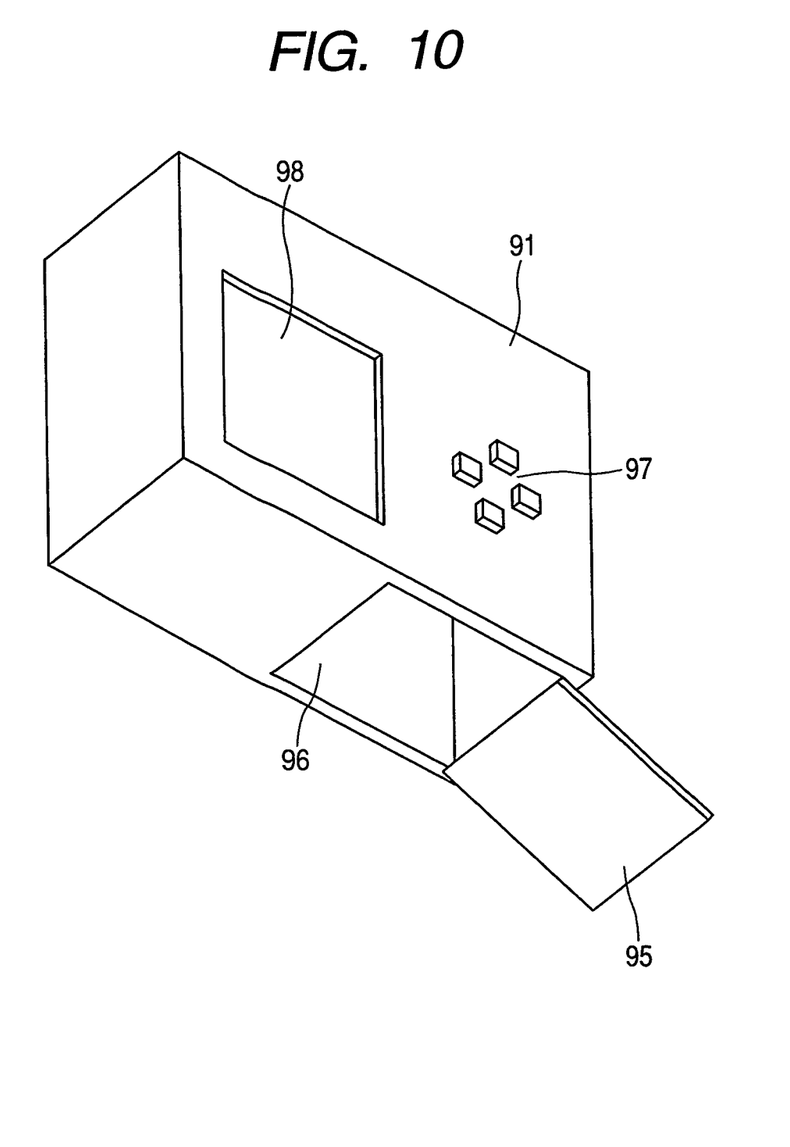
FIG. 10 is a schematic perspective view showing the rear surface and bottom surface of the digital camera of FIG. 9.
Figure 11:
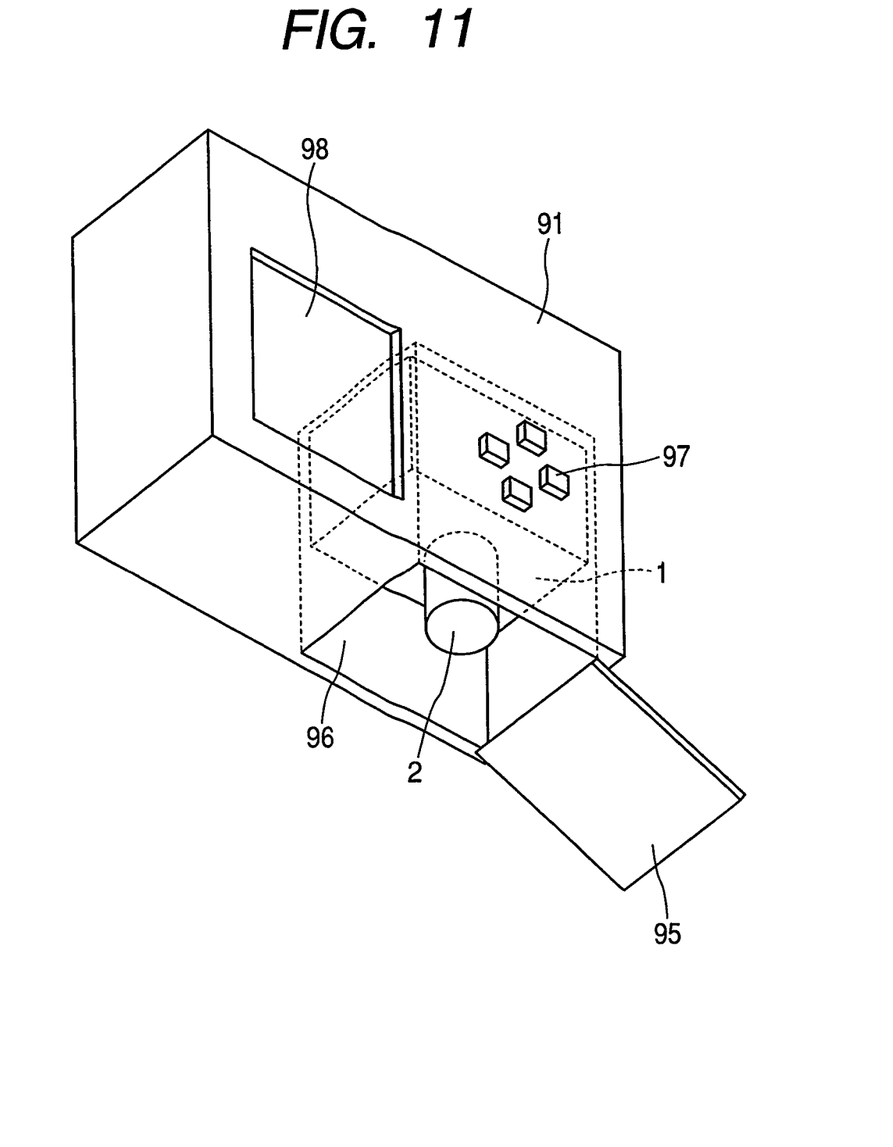
FIG. 11 is a schematic perspective view showing the state in which the fuel cell system and fuel cell cartridge of the present invention are attached to the digital camera shown in FIG. 10.

FIG. 10 is a schematic perspective view showing the rear and bottom surfaces of the digital camera shown in FIG. 9. FIG. 11 is a schematic view showing a state in which the fuel cell system and the fuel cell cartridge of the present invention are attached to the digital camera shown in FIG. 10. Reference numeral 95 denotes a lid of an attaching part 96, and reference numeral 96 denotes the attaching part (also referred to as "cell housing chamber") for housing the fuel cell system, reference numeral 97 denotes an operation switch for operating the digital camera, and reference numeral 98 is a liquid crystal screen for a view finder of the digital camera and for reviewing captured images, and the like.

In this embodiment, as the switch which is synchronized with the gas replacement operation, the main switch 93 is used as an example. However, with respect to the gas replacement in the fuel cell system operated on the side of a device, such as a digital camera, the operation switch 97 other than the main switch 93 may be used. Namely, the gas replacement may be controlled by the operation of the operation switch 97 on the device side. Of course, when the main switch, such as the power source switch of the device, is synchronized with the gas replacement, the replacement can be performed more easily because the main switch is the first switch to be operated when the device is used in many cases. Namely, if the user does not need to perform the gas replacement operation manually, gas replacement can be automatically performed and the fuel cell can be actuated, it is preferable that the switch synchronized with the gas replacement operation be the main switch.

In this example, the case of the fuel cartridge type is explained. However, but instead of the fuel cartridge, the present invention can suitably be applied to the case in which the fuel cell system is provided integrally with a fuel tank. Namely, the gas replacement may be performed depending on the output voltage of the fuel cell, or the gas replacement may be performed corresponding to the switch on the device side being turned "on" (especially, the main switch).

In this embodiment, the case of using the microcomputer provided in the digital camera as the control means for gas replacement has been explained, but the control means may be provided on the fuel cell system side and the gas replacement may be controlled by this control means.

INDUSTRIAL APPLICABILITY

With the gas replacement method of a fuel cell, the fuel cell system and the device for the fuel cell system, it is possible to more easily replace gas other than the fuel, which enters the fuel cell that is supplied with the fuel from a fuel cartridge or a fuel tank provided in the fuel cell system, with the fuel gas. Especially, the user does not need to perform the gas replacement operation manually. The gas replacement is performed automatically and the fuel cell can be actuated. The present invention can be applied to a fuel cell system used in automobiles, portable electronic devices, such as notebook computers, mobile phones and digital camcorders.

This application claims priority from Japanese Patent Application No. 2003-402841, filed Dec. 2, 2003, which is hereby incorporated by reference herein.

The invention claimed is:

1. A fuel cell system, comprising:
   a fuel cell;
   a connecting part configured and positioned to connect a fuel cartridge, the connecting part including a movable valve-pressing element positioned to abut a valve of the fuel cartridge and movable to a position to press the valve to an open position;
   a signal-producing sensor attached to the connecting part at a position facing and actuated by the fuel cartridge when the fuel cartridge is being connected to the connecting part; and
   a controller connected to the sensor and configured to cause the moving of the movable valve-pressing element to the position to press the valve of the fuel cartridge to the open position in response to the sensor abutting the fuel cartridge, thereby supplying a fuel from the fuel cartridge connected to the connecting part to start replacement of gas in the fuel cell system.

2. The fuel cell system according to claim 1, wherein the gas replacement is performed by a control means provided in a device to which the fuel cell system is attached, on the basis of the detection by the sensor.

3. The fuel cell system according to claim 1, wherein the control means performs the gas replacement on the basis of the detection by the sensor.

4. The fuel cell system according to claim 1, wherein the gas replacement is performed for a predetermined period of time.

5. The fuel cell system according to claim 1, further comprising a purge valve, wherein the purge valve opens on the basis of the detection to discharge gas in the fuel cell system.

6. The fuel cell system according to claim 1, further comprising a voltage detector for detecting an output voltage of the fuel cell, wherein the gas replacement is performed until the output voltage detected by the voltage detector becomes a predetermined value or more.

7. A fuel cell system, comprising:
   a fuel cell;
   connecting means for connecting a fuel cartridge;
   sensor means for detecting that the fuel cartridge is connected to the connecting means; and
   means for controlling the fuel cell system to cause a fuel to be supplied from the fuel cartridge connected to the connecting means in response to the sensor means detecting that the fuel cartridge is connected to the connection means to start replacement of gas in the fuel cell system as soon as the fuel cartridge is connected to the connecting means.

8. The fuel cell system according to claim 1, further comprising a movable diaphragm supporting the valve-pressing element and biasing the valve-pressing element toward the valve with a predetermined pressure.

9. The fuel cell system according to claim 8,
further comprising a first casing that houses the connecting part, the sensor, and gas to be consumed by the fuel cell system, and into which the fuel cartridge is removable attached, and
wherein the diaphragm is movable in response to a change in gas pressure inside the casing when the fuel cartridge is connected to the connecting part, so that the diaphragm moves the valve-pressing element to press the valve to the open position in response to a sufficient quantity of the consumable gas being consumed inside the first casing by the fuel cell system or in response to a sufficient quantity of the consumable gas being discharged outside the fuel cell system.

10. The fuel cell system according to claim 9, further comprising a second casing supporting the diaphragm and containing gas therein that provides the predetermined pressure on the diaphragm to bias the valve-pressing element toward the valve.

11. The fuel cell system according to claim 10, further comprising a spring connected to the diaphragm in such a manner as to contribute to the predetermined pressure on the diaphragm to bias the valve-pressing element toward the valve.

12. The fuel cell system according to claim 1, wherein the sensor comprises a microswitch positioned to be turned on by abutting the valve during the process of the connecting of the fuel cartridge to the connecting part.

13. The fuel cell system according to claim 12,
wherein the microswitch is turned on after an airtight fuel flow path is established between the fuel cell system and the fuel cartridge during the connecting of the connecting part to the fuel cartridge.

14. The fuel cell system according to claim 13,
wherein the connecting part further comprises a fixing element configured to engage a fixing element of the fuel cartridge at the end of the process of connecting the fuel cartridge to the connecting part to fix the fuel cartridge to the fuel cell system, and
wherein the microswitch is turned on before the fuel cartridge is fixed to the fuel cell system, but after the airtight fuel flow path is established between the fuel cell system and the fuel cartridge during the connecting of the connecting part to the fuel cartridge.

15. The fuel cell system according to claim 12,
wherein the valve-pressing element is configured and positioned to be movable in response to a change in gas pressure inside the fuel cell system,
wherein the fuel cell system further comprises a purge valve configured to discharge gas from the fuel cell system in response to an instruction from the controller that is issued when the microswitch is turned on as a result of the abutting the fuel cartridge during the process of the connecting of the fuel cartridge to the connecting part, thereby causing a change in pressure inside the fuel cell system sufficient to press the valve-pressing element against the valve to open the valve.

\* \* \* \* \*